(12) United States Patent
Christy et al.

(10) Patent No.: US 6,232,614 B1
(45) Date of Patent: May 15, 2001

(54) LOW-TEMPERATURE BLACKBODY RADIATION SOURCE

(76) Inventors: James W. Christy, 1720 W. Niona Pl., Tucson, AZ (US); James R. Rochester, 4551 Camino Gacela, Tucson, AZ (US) 85718

( * ) Notice: Subject to any disclaimer, the term of this patent is extended or adjusted under 35 U.S.C. 154(b) by 0 days.

(21) Appl. No.: 09/170,543

(22) Filed: Oct. 13, 1998

(51) Int. Cl.[7] .................................................. G01J 5/00
(52) U.S. Cl. .............................. 250/504 R; 250/338.5; 250/338.1
(58) Field of Search ........................... 250/493.1, 252.1, 250/339.08, 339.09, 213

(56) References Cited

U.S. PATENT DOCUMENTS

| | | | |
|---|---|---|---|
| 4,999,498 | 3/1991 | Hunt et al. | 250/338.5 |
| 5,399,856 * | 3/1995 | Sandridge et al. | 250/252.1 |
| 5,602,389 * | 2/1997 | Kato et al. | 250/252.1 |

* cited by examiner

Primary Examiner—Jack Berman
Assistant Examiner—Johnnie L Smith, II
(74) Attorney, Agent, or Firm—David W. Collins; Glenn H. Lenzen, Jr.

(57) ABSTRACT

A blackbody radiation source includes an insulated enclosure having a viewing aperture defining a line of sight through the wall of the enclosure. A heat sink, preferably a pool of liquid nitrogen, is located within the insulated enclosure. There is a viewing surface in thermal contact with the heat sink but having an unobstructed view through the viewing aperture. The viewing surface is inclined to the line of sight through the viewing aperture. A sensor is calibrated by placing the sensor in facing relation to the aperture and measuring an output black body signal of the sensor. The viewing surface may be radiatively heated concurrently with the measuring to produce a higher equivalent radiometric temperature.

19 Claims, 2 Drawing Sheets

LOW-TEMPERATURE BLACKBODY RADIATION SOURCE

BACKGROUND OF THE INVENTION

This invention relates to a blackbody radiation source operable at low temperatures.

Sensors such as imaging focal plane array sensors are calibrated prior to, and sometimes during, service. In one calibration procedure, the sensor is placed into a facing relation with a calibration source which produces a standard condition. The standard condition typically includes a simulated background field comparable with the background field expected in service for the wavelength range of the sensor but without any target present. The sensor is operated while facing the calibration source. From the data collected in the calibration procedure, the operability of, zero values for, and/or scaling factors for individual pixel sensor elements of the array are determined and stored for later use.

An important class of sensors includes infrared sensors for use in space or in viewing space from earth. The relevant background for the calibration of such sensors is a blackbody radiation source having a low temperature of 200®K. or less. One blackbody radiation source previously used for this calibration procedure has been a bath of liquid nitrogen or a flat metal container whose exterior is painted black and which is filled with liquid nitrogen. This type of source yields somewhat unpredictable equivalent radiometric temperatures. Reflections from the ambient environment may interfere with the measurement of the source. Additionally, this source is limited to a single source temperature and lacks the flexibility required for many applications.

There is a need for an improved low-temperature blackbody radiation source for use in calibrating sensors and in other applications. The present invention fulfills this need, and further provides related advantages.

SUMMARY OF THE INVENTION

The present invention provides a low-temperature blackbody radiation source which is operable for the calibration of sensors and other applications. The blackbody radiation source is operable at temperatures below 200®K. It is effective in reducing ambient radiometric reflections that otherwise interfere with the calibration performed using the blackbody radiation source. The aperture of the source may be made quite large, as may be required for large sensors. The equivalent radiometric temperature of the blackbody radiation source, in terms of spectrally integrated radiance, may be varied over a range of temperatures.

In accordance with the invention, a blackbody radiation source comprises an insulated enclosure having a viewing aperture defining a line of sight therethrough, and a heat sink within the insulated enclosure. The insulated enclosure preferably has a bottom, a top, and a lateral side, and the viewing aperture is through the lateral side of the insulated enclosure. The heat sink is preferably a pool of a liquefied gas lying around or below the level of the viewing aperture. The heat sink preferably has a temperature of no greater than the boiling point of nitrogen, and most preferably is a pool of liquid nitrogen. The blackbody radiation source further includes a viewing surface in thermal contact with the heat sink but having an unobstructed view through the viewing aperture, wherein the viewing surface is inclined to the line of sight through the viewing aperture. The viewing surface has a high-emissivity, diffuse surface over the radiation wavelength range of interest, with an emissivity that is preferably greater than about 0.97.

The viewing surface is desirably constructed as at least a portion of one side of the inner surface of a closed box having an outer surface in contact with the heat sink. The closed box is positioned inside the insulated enclosure, and the heat sink such as the pool of liquefied gas lies between an inner surface of the insulated enclosure and the outer surface of the closed box. The viewing surface is preferably inclined such that the viewing aperture lies within an acute angle formed between the viewing surface and a horizontal plane.

By making the substrate of the viewing surface of a relatively thin piece of a high thermal conductivity material such as aluminum, liquid oxygen from the atmosphere condenses on and flows over the viewing surface. The movement of the liquid oxygen prevents the buildup of condensed water on the viewing surface In one embodiment, the blackbody radiation source includes a heater whose radiant output is directed toward the viewing surface but which itself is not within the line of sight and therefore is not itself directly measured by the sensor being calibrated. The viewing surface is cooled from its back side by conduction from the heat sink, and is radiatively heated on its front side by the heater. Although the temperature of the viewing surface stays approximately constant at the temperature of the heat sink, radiant energy from the heater is reflected back from the viewing surface, through the aperture, and to the sensor being calibrated. By adjusting the power level of the heater, the amount of reflected energy reaching the sensor may be controllably varied, producing a condition wherein the equivalent radiometric temperature of the viewing surface source may be controllably varied. The ability to achieve a range of radiometric temperatures near that of the heat sink is an important advantage of the invention.

In operation, a sensor to be calibrated is placed into a facing relation with the aperture of the insulated enclosure and thence into a facing (but inclined) relation with the inclined viewing surface inside the enclosure. The blackbody radiation source is brought to the desired temperature state. The sensor is operated, and calibration is performed against the blackbody field.

The present invention thus provides an important advance in the field of blackbody radiation sources for use in the calibration of sensors and other applications. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
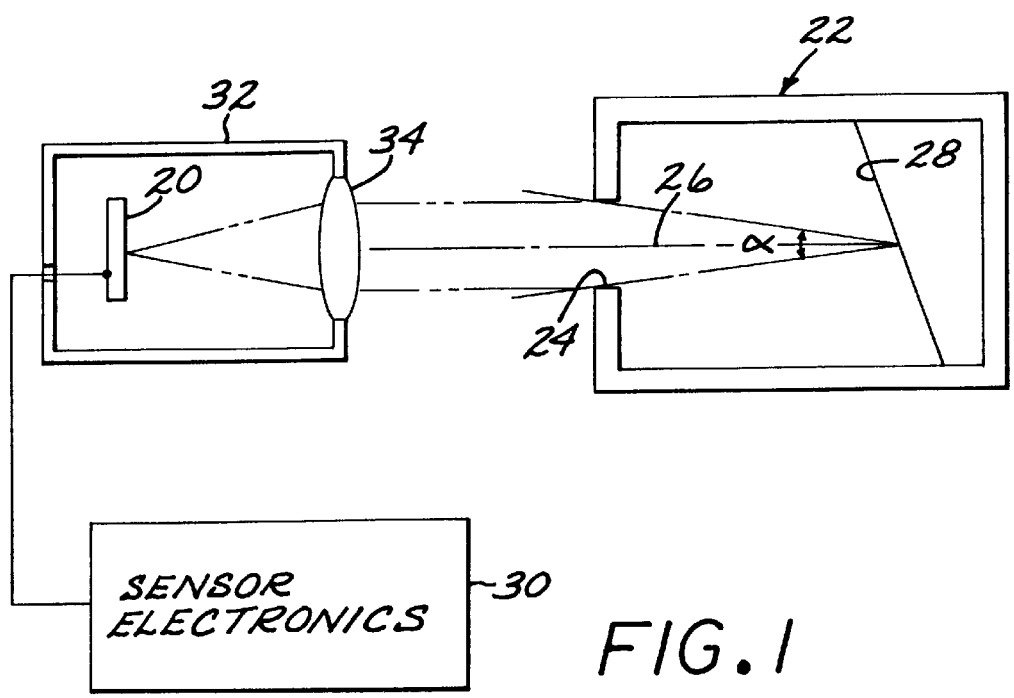
FIG. 1 is a schematic view of the apparatus arrangement in the calibration of a focal plane array sensor.

FIG. 1 illustrates an arrangement whereby a sensor 20 is calibrated using a blackbody radiation source 22. The sensor 20 is placed in a facing relationship to a viewing aperture 24 of the blackbody radiation source 22 along a line of sight 26. The sensor 20 views a viewing surface 28 within the blackbody radiation source 22, through the viewing aperture 24. The viewing aperture 24 subtends an arc α relative to the intersection of the line of sight 26 with the viewing surface 28. The angle α is preferably less than 1 radian, and most preferably less than 0.1 radian. The sensor 20 is typically located in a housing 32 and views the viewing surface 28 through appropriate optics, here indicated schematically by a single lens 34. The sensor 20 converts the incident radiation, in the wavelength band of the operation of the sensor 20, to an electrical signal which is monitored and analyzed by sensor electronics 30. Sensors 20 and sensor electronics 30 are well known in the art. The sensor 20 typically operates in the infrared band of from about 3 to about 12 micrometers wavelength, or in the subbands of from about 3 to about 5 micrometers wavelength or from about 7 to about 12 micrometers wavelength.

Figure 2:
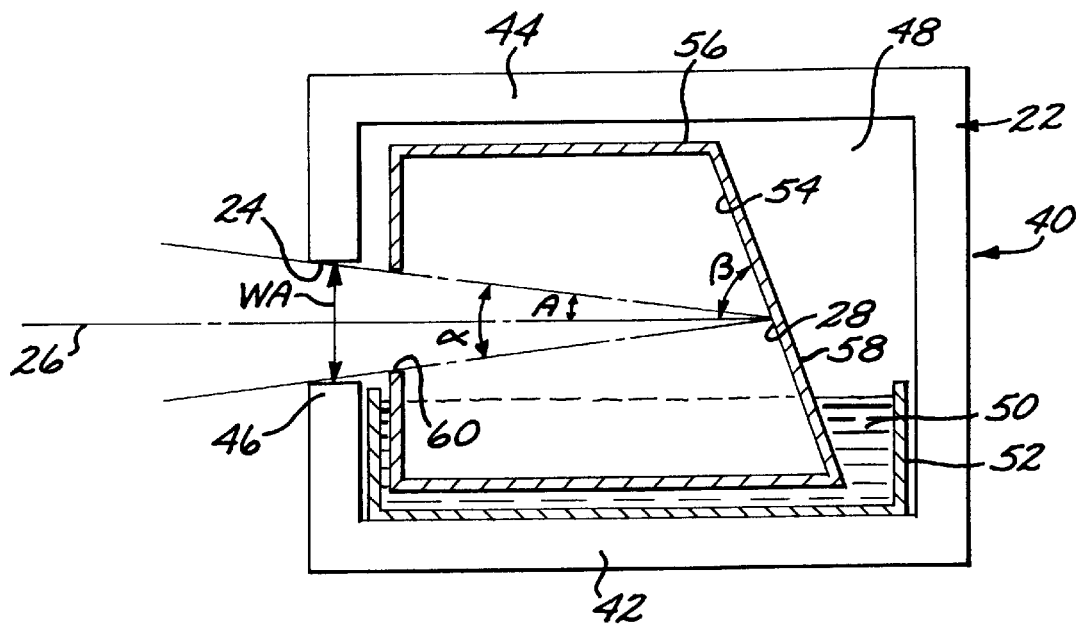
FIG. 2 is a sectional view of a first embodiment of the blackbody radiation source used in the calibration process.

FIG. 2 depicts one preferred embodiment of the blackbody radiation source 22 of the invention. An insulated enclosure 40 having the viewing aperture 24 therethrough is provided. The insulated enclosure 40 has a bottom 42, a top 44, and a lateral side 46. The viewing aperture 24 is preferably in the lateral side 46 at an intermediate location between the bottom 42 and the top 44. The insulated enclosure 40 is made of an insulating material such as Styrofoam™ foam material of thickness about 2–4 inches that insulates an interior 48 maintained at a temperature of below about 200®K.

A heat sink 50 is maintained within the insulated enclosure 40. The temperature of the heat sink is no greater than the boiling point of nitrogen, about 77®K. The heat sink is preferably a pool of a liquefied gas such as liquid nitrogen (LN$_2$) or liquid helium (LHe). Liquid nitrogen is preferred for the majority of the applications where equivalent radiometric temperatures above about 100 K are required.

In the embodiment of FIG. 2, the heat sink 50 is a pool of liquid nitrogen in a tray 52 that rests against the bottom 42 of the insulated enclosure 40. The level of the pool is below the aperture 24.

The viewing surface 28 is in thermal contact with the heat sink 50. There is an unobstructed view of the viewing surface 28 through the viewing aperture 24. The viewing aperture has a width $W_A$ and is spaced a distance $L_A$ from the viewing surface 28. The viewing surface 28 is inclined at an angle β to a horizontal plane. In this case, the line of sight 26 lies in the horizontal plane. In the embodiment of FIG. 2, the angle β is an acute angle of greater than 0 degrees but less than 90 degrees, and the viewing aperture 24 lies within that acute angle. In another embodiment that will be discussed in relation to FIG. 4, the angle β is obtuse, and the viewing aperture 24 lies within the obtuse angle. Most preferably, the angle β is from more than about 40 degrees to less than 90 degrees, or from more than 90 degrees to less than about 160 degrees. That is, the viewing surface 28 is inclined to the line of sight 26 and is not perpendicular to the line of sight 26. The inclining of the viewing surface 28 downwardly in FIG. 2 reflects specular thermal energy incident upon the viewing surface 28 through the viewing aperture 24 downwardly into the pool of liquid nitrogen. The thermal energy therefore cannot specularly reflect back through the viewing aperture 24 into the sensor 20 to alter the apparent radiometric temperature of the viewing surface 28. Stated another way, any energy directed to the viewing aperture 24 and thence to the sensor 20 comes from diffuse scattering from viewing surface 28 from input radiation from the viewing aperture 24, or from radiative emission from the viewing surface 28.

In the illustrated case, the viewing surface 28 comprises at least a portion of an inner surface 54 of a box 56 having an outer surface 58 in contact with the heat sink 50. The box 56 is closed on all sides except for an opening 60 corresponding to the viewing aperture 24. In the embodiment of FIG. 2, the side of the box 56 adjacent to the viewing aperture 24 need not be sealed to the wall of the insulated enclosure 40, because the liquid level of the liquid nitrogen is below the level of the viewing aperture 24.

The box 56 is preferably made of aluminum (including pure aluminum and aluminum alloys) having a thickness of more than about 0.1 inch. Other high thermal conductivity materials such as copper, silver, and beryllium (including their alloys) may also be used The inner surface 54 of the box 56, at least in the region of the viewing surface 28, has a high emissivity in reflection in the infrared ranges of interest. The high emissivity surface is typically achieved by anodizing the aluminum to a black color.

Figure 3:
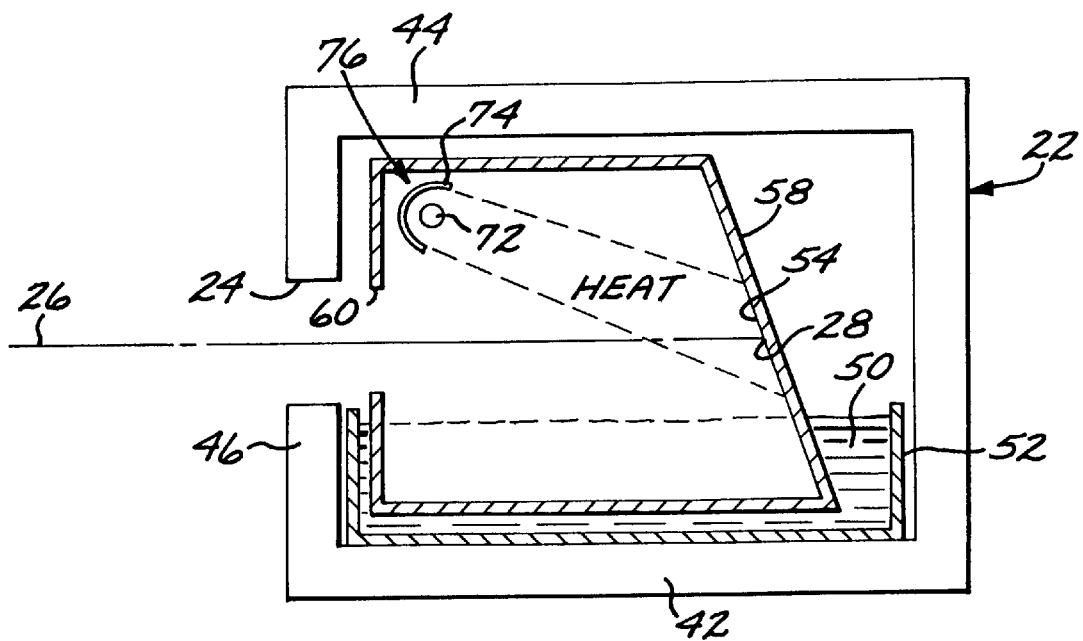
FIG. 3 is a sectional view of a second embodiment of the blackbody radiation source used in the calibration process.

The embodiment of FIG. 3 is like that of FIG. 2 in major respects, and the above description and reference numerals are incorporated herein. The embodiment of FIG. 3 adds at least one heater 70 that is out of the line of sight 26 from the sensor 20 through the viewing aperture 24. The heater 70 may be placed inside the box 56 and just above the opening 60. Most preferably, the heater 70 includes an electrical resistance heating element 72 and a reflector 74 that directs the radiant energy of the heating element 72 toward the viewing surface 28 and shields the line of sight 26 from the viewing aperture 24. When an electrical current is passed through the heating element 72, heat is generated and directed toward the viewing surface 28. The magnitude of the electrical current determines the amount of heat generated and consequently the radiant energy directed toward the viewing surface 28. Some of the photons of energy, typically about 1 to 4 percent, are reflected from the viewing surface 28 back through the aperture 24 and to the sensor 20 being calibrated. The viewing surface 28 remains at approximately the temperature of the heat sink, but its apparent radiometric temperature increases as more photons are produced by the heating element 72 and reflected back through the aperture 24 to the sensor 20. Accordingly, the apparent radiometric temperature of the viewing surface 28, in terms of photons per second per square centimeter per steradian integrated over the sensor response range, may be increased from that of the heat sink to greater apparent temperatures over a controllable range by increasing the current to the heating element 72. This ability to controllably vary the apparent radiometric temperature of a calibratior source operating at cryogenic temperature is valuable in calibrating sensors for use in space applications or which otherwise view space.

Figure 4:
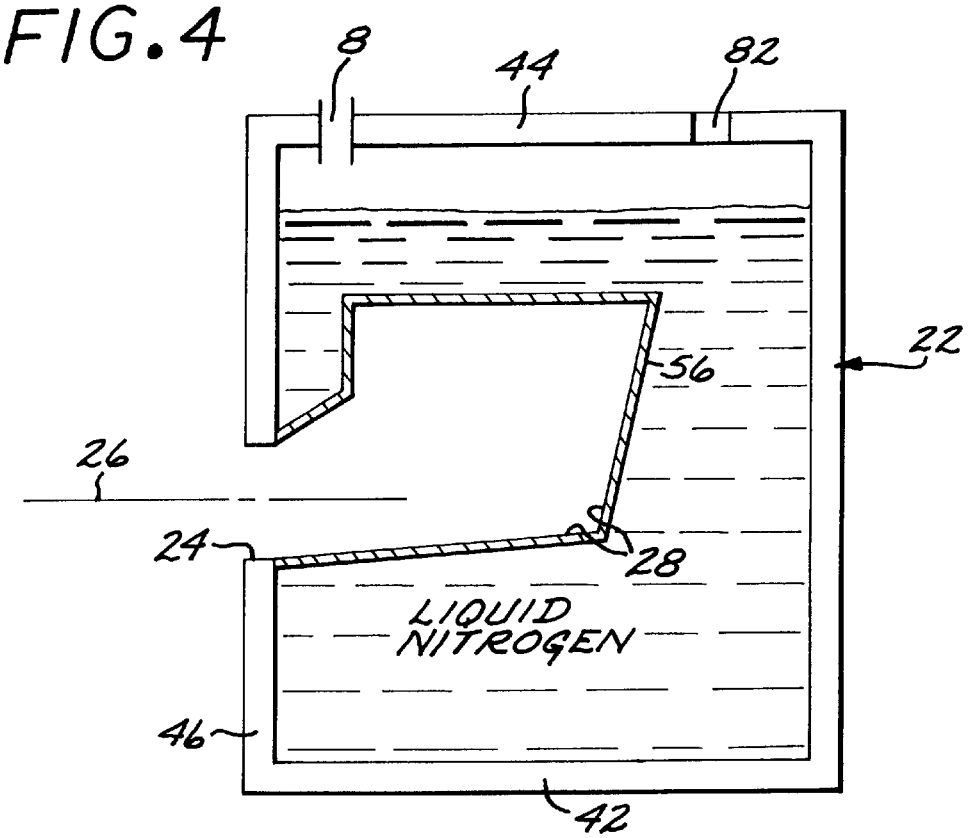
FIG. 4 is a sectional view of a third embodiment of the blackbody radiation source used in the calibration process.

FIG. 4 illustrates another embodiment of the blackbody radiation source 22. Many of the elements are the same as in FIG. 2, and the above description and reference numerals are incorporated herein to the extent of the similarity. The embodiment of FIG. 4 differs in that the box 56 is sealed to the insulated enclosure at the viewing aperture 24. The liquid level of the liquid nitrogen may therefore extend above the viewing aperture 24 and above the box 56, achieving more efficient cooling of the box 56. A fill tube 80 and a gas vent 82 are provided through the top 44 of the insulated enclosure 40 in this embodiment. This embodiment may also be provided with a heater 70, as discussed in relation to FIG. 3.

The embodiment of FIG. 2 was built with a two-inch aperture 24, and the embodiment of FIG. 4 was built with a one-inch aperture 24. These aperture sizes may be readily scaled upwardly or downwardly. As a practical matter, the embodiment of FIG. 2 is more preferred for applications where the source and aperture must be large, as it requires less coolant than the embodiment of FIG. 4. Both embodiments achieved radiometric temperatures of less than 160®K.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A blackbody radiation source, comprising:
   an insulated enclosure having a viewing aperture defining a line of sight therethrough;
   a heat sink within the insulated enclosure, the heat sink having a temperature of no greater than the boiling point of nitrogen; and
   a viewing surface in thermal contact with the heat sink but having an unobstructed view through the viewing aperture, the viewing surface being inclined to the line of sight through the viewing aperture.

2. The blackbody radiation source of claim 1, wherein the heat sink comprises:
   a pool of a liquefied gas.

3. The blackbody radiation source of claim 1, wherein the heat sink comprises:
   a pool of liquid nitrogen.

4. The blackbody radiation source of claim 1, wherein the insulated enclosure has a bottom, a top, and a lateral side, and wherein the viewing aperture is through the lateral side of the insulated enclosure.

5. The blackbody radiation source of claim 4, wherein the heat sink comprises:
   a pool of a liquefied gas having a liquid surface level above the level of the viewing aperture.

6. The blackbody radiation source of claim 4, wherein the heat sink comprises:
   a pool of a liquefied gas having a liquid surface level below the level of the viewing aperture.

7. The blackbody radiation source of claim 1, wherein the viewing surface is inclined such that the viewing aperture lies within an acute angle formed between the viewing surface and a horizontal plane.

8. The blackbody radiation source of claim 1, wherein the viewing surface is inclined such that the viewing aperture lies within an obtuse angle formed between the viewing surface and a horizontal plane.

9. The blackbody radiation source of claim 1, wherein the viewing surface is inclined to the line of sight by an angle selected from the group consisting of from about 40 degrees to less than 90 degrees, and from greater than 90 degrees to about 160 degrees.

10. The blackbody radiation source of claim 1, further including:
    a heater operable to heat the viewing surface but which itself is not within the line of sight.

11. The blackbody source of claim 1, wherein the viewing aperture subtends an arc of no greater than 1 radian as measured from the viewing surface.

12. The blackbody source of claim 1, wherein the viewing aperture subtends an arc of no greater than 0.1 radian as measured from the viewing surface.

13. The blackbody radiation source of claim 1, wherein the viewing surface comprises at least a portion of an inner surface of a closed box having an outer surface in contact with the heat sink.

14. The blackbody radiation source of claim 1, wherein the viewing surface is made of a metal selected from the group consisting of aluminum, copper, beryllium, and silver, and combinations and alloys thereof.

15. The blackbody radiation source of claim 1, wherein the viewing surface is black anodized aluminum.

16. The blackbody radiation source of claim 1, wherein the viewing surface has an emissivity of greater than about 0.97.

17. A blackbody radiation source, comprising:
    an insulated enclosure having a viewing aperture defining a line of sight therethrough;
    a heat sink within the insulated enclosure; and
    a viewing surface in thermal contact with the heat sink but having an unobstructed view through the viewing aperture, the viewing surface being inclined to the line of sight through the viewing aperture.

18. A method for calibrating a sensor operable in an infrared wavelength range, comprising the steps of
    providing a sensor operable in an infrared wavelength range of from about 3 to about 12 micrometers;
    providing a blackbody radiation source, comprising:
        an insulated enclosure having a viewing aperture defining a line of sight therethrough,
        a heat sink within the insulated enclosure, the heat sink having a temperature of no greater than the boiling point of nitrogen, and
        a viewing surface in thermal contact with the heat sink but having an unobstructed view through the viewing aperture, the viewing surface being inclined to the line of sight through the viewing aperture;
    positioning the sensor in a facing relationship to the aperture; and
    measuring an output signal of the sensor.

19. The method of claim 18, including an additional step, performed concurrently with the step of measuring, of
    radiatively heating the viewing surface.

* * * * *